United States Patent
Chisolm et al.

(10) Patent No.: US 11,943,302 B2
(45) Date of Patent: Mar. 26, 2024

(54) ENHANCED INTERMEDIATE SERVER

(71) Applicant: Universal Air Travel Plan, Inc., Washington, DC (US)

(72) Inventors: Charisse Chisolm, Atlanta, GA (US); Delila Causevic, Portland, OR (US)

(73) Assignee: UNIVERSAL AIR TRAVEL PLAN, INC., Washington, DC (US)

( * ) Notice: Subject to any disclaimer, the term of this patent is extended or adjusted under 35 U.S.C. 154(b) by 0 days.

(21) Appl. No.: 17/854,691

(22) Filed: Jun. 30, 2022

(65) Prior Publication Data

US 2023/0254372 A1 Aug. 10, 2023

Related U.S. Application Data

(60) Provisional application No. 63/306,759, filed on Feb. 4, 2022.

(51) Int. Cl.
| | |
|---|---|
| *H04L 67/12* | (2022.01) |
| *G06F 21/64* | (2013.01) |
| *G06Q 10/02* | (2012.01) |
| *G06Q 20/02* | (2012.01) |
| *G06Q 20/38* | (2012.01) |

(52) U.S. Cl.
CPC ............ *H04L 67/12* (2013.01); *G06F 21/64* (2013.01); *G06Q 10/02* (2013.01); *G06Q 20/027* (2013.01); *G06Q 20/389* (2013.01)

(58) Field of Classification Search
CPC ....... H04L 67/12; G06F 21/64; G06F 17/301; G06Q 10/02; G06Q 20/02; G06Q 20/10; G06Q 20/38; G06Q 20/389
USPC ...................................................... 709/203
See application file for complete search history.

(56) References Cited

U.S. PATENT DOCUMENTS

| | | | |
|---|---|---|---|
| 10,417,639 B1 * | 9/2019 | Beatty ................. | G06Q 20/102 |
| 10,977,742 B1 * | 4/2021 | Macy ................... | G06Q 40/12 |
| 11,587,082 B1 * | 2/2023 | Balasubramanian ....... G06Q 20/401 | |
| 2010/0312586 A1 * | 12/2010 | Drefs .................. | G06Q 10/02 705/14.27 |
| 2011/0029336 A1 * | 2/2011 | Vieillard-Baron ... | G06Q 10/025 707/674 |
| 2011/0071864 A1 * | 3/2011 | Hourdou ............... | G06Q 10/02 707/769 |
| 2012/0265562 A1 * | 10/2012 | Daouk ................. | G06Q 10/10 705/5 |

(Continued)

FOREIGN PATENT DOCUMENTS

EP 4137948 A1 * 2/2023 ............ G06F 11/263

OTHER PUBLICATIONS

Rahmatian S. Transaction Processing Systems. Encyclopedia of Information Systems. 2002;4:479. (Year: 2002).*

(Continued)

*Primary Examiner* — James N Fiorillo
(74) *Attorney, Agent, or Firm* — GRASSO PLLC

(57) ABSTRACT

Services can be provided by one or more Intermediary Transaction Processing Server(s) (ITPS) whereby a client computing system can obtain additional and/or expedited services from a third-party computing system, via one or more ITPS, without necessarily needing an update or other modification to the client computing system before obtaining the additional and/or expedited services from the third-party computing system.

20 Claims, 7 Drawing Sheets

(56) References Cited

U.S. PATENT DOCUMENTS

| | | | | |
|---|---|---|---|---|
| 2013/0151289 A1* | 6/2013 | Nivet | .................... | G06Q 50/14 705/5 |
| 2015/0081553 A1* | 3/2015 | Smith | .................... | G06Q 20/10 705/44 |
| 2015/0294234 A1* | 10/2015 | Alberola | ................ | G06Q 10/02 705/5 |
| 2016/0012353 A1* | 1/2016 | Falkowska | ............ | G06Q 10/02 705/5 |
| 2016/0092796 A1* | 3/2016 | Tran | ...................... | G06Q 50/14 705/5 |
| 2016/0217046 A1* | 7/2016 | Lamoureux | ............ | G06Q 10/02 |
| 2017/0262852 A1* | 9/2017 | Florimond | ........... | G06Q 20/389 |
| 2017/0270111 A1* | 9/2017 | Angelini | ............... | G06F 16/214 |
| 2017/0316388 A1* | 11/2017 | Iyer | ..................... | G06Q 20/405 |
| 2018/0060836 A1* | 3/2018 | Castagna | ............... | G06Q 20/10 |
| 2018/0300805 A1* | 10/2018 | Elliott | .................... | G06Q 30/02 |
| 2019/0197538 A1* | 6/2019 | Hamon | ................ | G06Q 20/027 |

OTHER PUBLICATIONS

BSP Data Interchange Specifications Handbook, Revision 23, Update Bulletin Jan. 2019, Apr. 2019, pp. 1-409, International Air Transport Association, Canada.

* cited by examiner

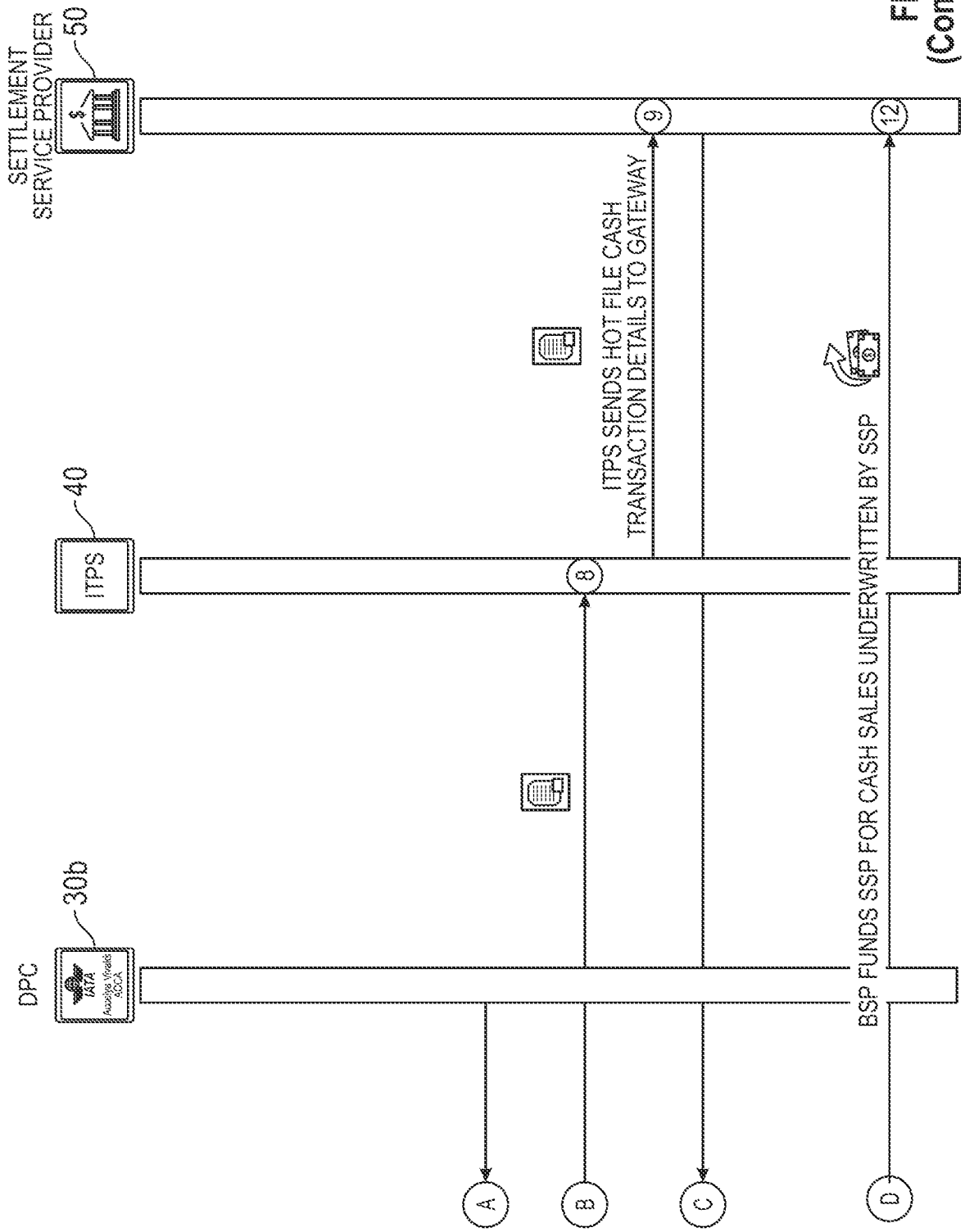

ENHANCED INTERMEDIATE SERVER

RELATED APPLICATION

This application claims priority to and the benefit of U.S. patent provisional application 63/306,759, which was filed on Feb. 4, 2022 and is entitled Enhanced Intermediate Server Services. The '759 application is incorporated by reference herein in its entirety.

BACKGROUND

Enhanced intermediate computer server systems, process, devices, and articles of manufacture are provided. More specifically intermediate server processes, systems, devices and articles of manufacture wherein a client computing system can benefit from certain third-party processing of batch files, via an intermediate server, without the client computing system having been previously upgraded or otherwise modified to communicate with the third-party for obtaining the certain third-party processing of, or related to, the batch files.

Booking airline travel involves numerous actors and numerous communications between various computing systems. These computing systems include airline computing systems; travel agency computing systems; traveler computing systems; Global Distribution System (GDS) computing systems; International Air Transport Association (IATA) computing systems; financial institution banking systems; and Settlement Service Provider (SSP) computing systems. These various computing systems may communicate in various ways using confidential secure communication protocols and certain standardized file syntaxes for booking, editing, and completing travel itineraries of travelers. The services provided to travelers include scheduling travel, selling tickets, managing baggage, editing existing booked tickets, and handling payments and refunds. A change in communication protocols or standardized syntaxes by one involved computing system can demand updates to other computing systems in order to enable future communications between certain systems. The communication protocols and standardized syntaxes provide settled expectations that allow for ongoing computer system maintenance and ongoing servicing of travel, travel requests, and itinerary management.

DETAILED DESCRIPTION

Figure 1:
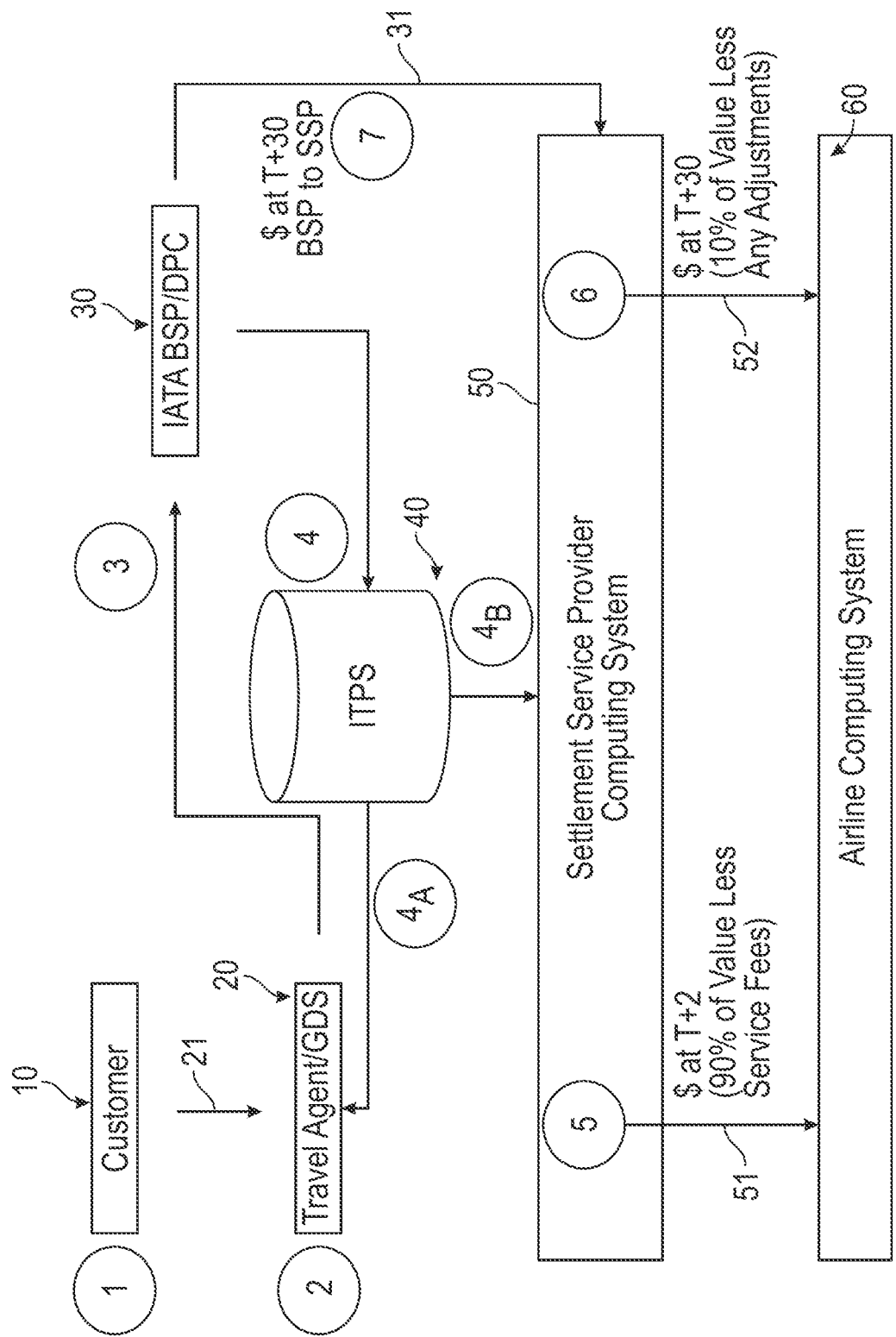
FIG. 1 shows exemplary process flow using an Intermediary Transaction Processing Server (ITPS) as may be employed in some embodiments.

Embodiments can include devices, articles of manufacture, and processes as may be employed in support of enhanced intermediate server services taught herein. Embodiments can regard enhanced intermediate transaction server(s). For example, additional services can be provided by one or more Intermediary Transaction Processing Server(s) (ITPS) whereby a client computing system can obtain additional and/or expedited services from a third-party computing system, via one or more ITPS, without necessarily needing an update or other modification to the client computing system before obtaining the additional and/or expedited services from the third-party computing system. Advantages of such embodiments may include reducing or eliminating the need to update or modify a client computing system or other computing system, to communicate to or with other computing systems while still being able to receive the additional and/or expedited services associated with the third-party computing system even though the client computing system or other computing system is incompatible with the third-party computing system or otherwise not adapted to directly request and/or receive the additional and/or expedited services from the third-party computing system.

Client computing systems may include individual computing systems or groups of servers or other individual or grouped computing systems configured to receive and track customer orders and to receive payments for services or goods provided by the client, or its proxy, to a client customer. Client computing systems may be configured with communication protocols and/or syntax modules suitable to interact with other servers or computing devices. These interactions can include sending and receiving signals and instructions indicative of certain customer orders and certain payments including, for example, particulars such as order number, service requested, goods requested, quoted price, travel itinerary, personal name record, baggage status, specialty conditions, meal status, payment status, group member names, and certain payment methods, for example.

Embodiments can provide for additional services, such as batch file parsing, breakdown, and/or quantification, being provided to a client computing device without requiring that the client computing device is programmed or otherwise compatible to parse a batch file and extract individual data elements for certain transactions or other groupings carried by the batch file. Embodiments may provide intermediary translation services, proxy services, financing services, and combinations thereof to client computing systems. These translations, proxy, financing, or other services can enable the client computing systems to receive additional services or be apprised of additional services from other entities via the client's existing client computing platforms with little to no additional configuration directed to communicating to and or from the additional other third-party computing systems or other computing systems for the enhanced and/or expedited services. Client computing system resources, such as memory, processing speed, and overall system burden may be decreased, maintained or only slightly increased even though additional services, which may not otherwise be available to the client computing system under its present configuration, are being provided or being apprised of through the use of one or more ITPS in embodiments.

Embodiments may comprise a third-party computing system that may run a Billing and Settlement Plan (BSP) (e.g., a transaction platform) that manages the sales, reporting, and remittance procedures between travel agencies and airlines. An ITPS provider may provide a Billing Settlement Plan (BSP) batch file handling solution that comprises a server or other computing system with an ITPS provider's existing connectivity to a plurality of numerous third-party settlement systems e.g., third-party Billing Settlement Plan (BSP) markets or Cargo Account Settlement Systems (CASS), to deliver the data and files necessary to pay airlines, travel agents or other clients for services such as passenger tickets or passenger services, paid with a BSP cash solution in advance (approximately two days or less) of existing timelines (e.g., 7-30 days). Thus, an ITPS may intervene with existing transaction files of a client computing system (single transaction or batch), harvest or otherwise obtain data from these files (single transaction or batch), and provide such data to another third party computing system, for example a gateway to an SSP or a travel agent computing system, such that the client computing system or a travel agent computing system or other entity computing system may receive SSP services or other benefits without necessarily being specifically programmed or otherwise configured to specifically request these services from the SSP or other computing system.

For example, embodiments may involve a traveler computing system, a travel agent computing system, a third-party billing and settlement plan computing system, an ITPS, a settlement service provider (SSP) computing system, and an airline computing system. The travel agent computing system may obtain, sell, and/or set up numerous travel itineraries during a day or other period and sell tickets for these itineraries and schedule other attributes of the itineraries, e.g., meals, bags, seat locations, etc. The travel agent may collect funds for these itineraries and periodically generate batch files at the end of the day or the conclusion of some other period. This batch file can show the total payments collected and/or have more specific details with regards to each booked itinerary. The batch file can be received by the airline computing system as well as by an ITPS or other computing system. The ITPS can parse the batch file and fill in missing data elements by inferring from other available data element in the batch file or otherwise available to the ITPS. The ITPS can also parse individual itineraries for reporting to the airline computing system such that the airline computing system can receive and account for these individual itineraries without having to parse the previously received batch file. The ITPS may send particulars from the batch file to a gateway of a settlement service provider (SSP) computing system. The gateway may be another entity computing system providing related services on behalf of the ITPS and/or the SSP. The SSP may then provide funding to an airline account or travel agency account or other entities benefit on time plus 2 or other expedited basis without the airline computing system or travel agent computer system or other entity computing system making a request from the SSP for the funding. In embodiments, the SSP may provide funding particulars to the airline computing system and then be subsequently reimbursed after providing the funding to a financial institution acting on behalf of an airline. The SSP computing system and/or a related account may be reimbursed by third-party billing and settlement plan computing systems. The SSP may facilitate payment in different amounts to accounts of the airline or travel agency or other service providers, for example, paying 90% at T+2 and the remaining 10% at T+30.

According, in some embodiments, a third-party may provide a billing and settlement computing plan computing system that manages portions or all of the sales, reporting, and remittance procedures between customers and clients, for example, between travel agencies or freight forwarders and airlines. An ITPS in embodiments may provide intermediary services for providing a client computing system with additional services not offered by a computing platform to which the client is configured to communicate, but, instead, offered by another party without necessitating a full or any reprograming of the client computing system in order to receive the additional services offered by a third-party computing system. For example, the ITPS provider may provide expedited payment options or more detailed payment processing, which can result in enhanced payment services not previously offered by a third-party platform to a client or a plurality of clients.

In embodiments, an ITPS may offer other services to a client computing device as well. These may include simplified capture/settlement transactions services during cash or credit card payment processing flow. In embodiments, an ITPS may be configured to communicate to and from various third-party server computing systems in order to provide the unique or enhanced payment options or other services to the client computing system or a plurality of client computing systems or a travel agent computing system or a plurality of travel agent computing systems or other entity computing systems. In embodiments, a third-party computing system may itself be configured to communicate with a fourth, or, fifth party computing system to supplement the services provided by the third-party computing system and being received by the client without the client being necessarily configured to specifically interact with the third, fourth, or, fifth party computing systems server for the specific enhanced services. In embodiments, an ITPS may be configured to query for, receive, and/or send certain batch files from a client computing system or another computing system. Also, an ITPS may be configured to parse or otherwise use these batch files for purposes of providing services to a client computing system that the client computing system is not necessarily presently configured to obtain.

In embodiments, an ITPS may develop a secure connection to deliver necessary data and files through a gateway to a 'liquidity platform'. The liquidity platform may consist of a separate server and a Special Purpose Vehicle (SPV), e.g., a fourth-party computing system designated to secure liquid assets that can be used to advance settlement funds to airlines or other clients.

An ITPS can also be used for other use cases, such as billing and settlement between freight forwarders and airlines rather than between travelers and travel agents and airlines. Freight forwarders, for example, may be managed by an ITPS provider's Cargo Account Settlement Systems (CASS), as well as credit card settlement services and may employ the techniques and computing systems and taught herein. As such, various processes, modules, and systems may be employed by an ITPS.

Embodiments may include an intermediary transaction processing server (TIPS) comprising a processor and a memory storing instructions. These stored instructions, when executed by the processor, may cause the processor to perform processes such as receiving, via a network, a copy of a third-party data batch hand-off-tape (HOT) file, the batch HOT file containing travel transaction data for a plurality of travel transactions, the travel transaction data comprising travel itinerary information and received cash payment information; identifying received cash payment information from the received copy of the batch HOT file; and sending identified received cash payment information from the received copy of the batch HOT file to a settlement service provider (SSP) gateway. The gateway may provide the received cash payment information to an SSP computing system, the SSP computing system may use the received cash payment information to provide cash funding to an airline computing system without the airline computing system having been configured to request cash funding from the SSP computing system for travel transactions from the batch HOT file.

In some embodiments, the processor of an ITPS may identify travel itinerary data and determining if any data are missing in a batch HOT file and, if data are determined to be missing, infer missing data for a specific travel itinerary using information parsed from the received batch HOT file (or previous received batch HOT files) and/or identify a single travel itinerary from the plurality of travel transactions. In some embodiments, a batch HOT file may be received from an airline computing system. In some embodiments, the processor of an ITPS may parse a batch HOT file to identify individual cash transactions from the batch HOT file and/or perform a series of data integrity checks to verify that travel itinerary certain data are included in the batch HOT file. In some embodiments, the processor of an ITPS may individually send identified individual cash transactions from the batch HOT file to the SSP computing system for use by the SSP computing system and/or make available for display at a different location, information regarding identified individual cash transactions from the parsed batch HOT file. In some embodiments, a copy of the batch HOT file may be received on a daily basis or some other periodic or nonperiodic time table.

Embodiments may include an intermediary transaction processing server (TIPS) comprising a processor and a memory storing instructions. These stored instructions, when executed by the processor, may cause the processor to perform processes such as receiving, via a network, a copy of a third-party data batch hand-off-tape (HOT) file, the batch HOT file containing a plurality of passenger name records (PNRs), each passenger name record (PNR) comprising travel itinerary information and travel payment information; identifying cash transaction data from the travel payment information from the received copy of the batch HOT file; and sending identified cash transaction data from the received copy of the batch HOT file to a settlement service provider (SSP) gateway, the gateway providing the cash transaction data elements to an SSP computing system, the SSP computing system using the received identified cash transaction data elements to provide cash funding to an airline account without an airline computing system having been configured to request cash funding from the SSP computing system for travel itineraries from the batch HOT file.

In some embodiments, the processor of an ITPS may identify itinerary data and determining if any data are missing in the batch HOT file and, if data are determined to be missing, infer missing data using information parsed from the received batch HOT file. Also, a processor of an ITPS may identify a single travel itinerary from a passenger name record (PNR) of the plurality of passenger name records (PNRs) and may receive the batch HOT file containing the PNR from the airline computing system. This received batch HOT file may also be parsed to identify individual cash transactions from the batch HOT file. Still further, a processor of an ITPS may be configured to identify a single travel itinerary from the plurality of passenger name records and perform a data integrity check of a single travel itinerary to verify that meal data or bag or other ancillary data or more or less are included in the PNR. Similarly, the processor may be configured to process a data integrity check of a PNR and if missing data is identified, fill in missing data in the PNR using data inferred from a batch HOT file. In embodiments, a processor of an ITPS may make available for display, at a location apart from the location of the ITPS, information regarding identified individual cash transactions from the parsed batch HOT file.

Embodiments may comprise processes for handling a computer batch file. These processes can comprise receiving a third-party data batch file, the batch file comprising a plurality of passenger name records (PNRs), the PNRs of the batch file each comprising name, passage date and ticket number; searching for one or more missing data elements from a first passenger name record in the batch file of PNRs; if a missing data element is found in the first passenger name record, entering inferred data into the missing data element, the data inferred from the HOT file or a previous HOT file or from another source; parsing a second passenger name record from the batch file of PNRs; sending the parsed second passenger name record to a gateway for a settlement service provider computing system; and the settlement service provider computing system providing funding for the batch file to the airline server system, wherein the airline server system was not configured to request funding associated with the batch file from the settlement service provider computing system prior to receipt of the funding.

Embodiments may exist wherein a settlement service provider computing system provides information linking funding received by an airline server system with individual PNRs from the batch file and/or wherein a received batch file is sent by the airline server system and/or the settlement service provider computing system provides funding for the batch file to the airline or travel agency or freight forwarder server system in a timeframe mimicking a settlement cycle of a credit card transaction. Embodiments may exist where a received batch file is a hand off tape (HOT) file previously received by an airline server system and subsequently sent by the airline server system to an ITPS after its receipt.

Embodiments may enable a client computing system to obtain beneficial transactions with existing customer types via an ITPS and the use of third-party transaction servers. In embodiments, an ITPS server may communicate back and forth with a third-party server or other computing device such that the third-party server or other computing device can communicate with and receive services from a fourth and fifth party computing system in order to provide the services of the fourth and fifth parties to the client without the client computing device being necessarily configured to communicate directly with the third, fourth or fifth computing devices for purposes of obtaining the services offered by the fourth and/or fifth parties.

In embodiments, an ITPS server may query, send, receive, or parse files on behalf of a client and provide selected data to a third-party such that the third-party computing system may trigger handling of the requisite services from the fourth or fifth party for the client. When clients are airline computing devices, ITPS embodiments may comprise compliance modules in a computing system in order to receive, store, parse, and otherwise process batch HOT files from an airline computing system for subsequent processing through a gateway and by settlement service providers and subsequent funding service providers.

In embodiments, an ITPS may be configured to onboard and manage client computing systems intended to use a third-party service server or other computing device. An ITPS may be configured such that client IATA CSI (Credit Transaction Invoicing File) and/or IATA HOT (Hand off Tape) files may be handled by an ITPS. A third-party service server or other computing device may be sent some or all relevant transaction information from the CSI or HOT or other batch files in order to create settlement files, to pull funds from fourth or fifth parties (e.g., card issuers or cash financers) and fund the client (e.g., airline, travel agency, freight forwarder) for those associated transactions.

In embodiments, credit card transactions may employ IATA CSI files that may contain some or all of the credit card transaction information and their associated authorization information. IATA HOT files may employ both cash and credit card transaction information and the processing by an ITPS may vary depending on which file a client may provide. Embodiments may also be paired such that only cash or credit transaction information is handled by an ITPS on behalf of a client computing system.

In embodiments, CSI/HOT files may contain information on *ALREADY* executed transactions that the client (e.g., airlines (or their travel agents)) has taken as payment for tickets, upgrades, refunds, other services or goods, etc. but transactions that have *NOT* yet been settled by the card schemes provided by the fourth-party servers. As such, an ITPS may be configured to parse the CSI/HOT files of unsettled transactions, process, and store the information of these files and then "replay" them into a third-party gateway so that the third-party can create settlement files that go directly to the fourth-party card schemes or the fifth-party cash schemes to enable settlement of these transactions. In so doing, the client computing systems and the ITPS need not handle all details of a settlement process with a fourth-party service provider and/or a fifth party service provider.

Still further, embodiments may also comprise solely having CSI files sent for settlement to card schemes while HOT files may be used for cash transactions. Also, in some embodiments, the parsed transaction data may solely be sent to the gateway by an ITPS or other entity computer system so that a settlement service provider computing system can be apprised of what to prefund an airline, travel agency, or freight forwarder.

In embodiments, a CSI file may contain rows listed on a per ticket basis and not on a transaction itself basis. As such, an ITPS may employ a Form of Payment Identifier field and Approval Code to group tickets in an original transaction. One ticket in a transaction may be deemed a so-called primary ticket, and that primary ticket may be identified based on records that follow it (e.g., authentication records, transaction information, flight details, etc.). Such records may also be prescribed as information on all of the tickets. An ITPS may be configured to pass those transaction files to a third-party computer server by employing 'dummy' payment call groups, which can gather all the tickets in one transaction. Comparatively, in some embodiments, an ITPS may configure transaction files such that settlement and refund calls are per ticket and whereby ticket amounts should preferably match the resulting transaction amount.

An ITPS may be configured to review and/or supplement one or more of the following IATA standardized file configurations when processing batch files or conducting other processes of embodiments: Sales; TKTT (Electronic Ticketing Sale, i.e. regular tickets); EMDA (ancillaries associated with the existing passenger tickets, e.g., luggage, upgrades, meals); EMDS (standalone ancillaries, not associated with the existing passenger tickets, e.g., luggage, upgrades, meals); TASF (Travel Agency Service Fees, which may come associated with a ticket, e.g., where the use case may be a travel agency charging a customer additionally on a cost of a ticket and the airline would be responsible for receiving the funds and refunding the agency on that amount); RFNC (refunds); RFND (refunds); Referenced Refunds (refunds on the transactions that were previously settled with the third-party. Here, an ITPS may query or search for the original ticket number and provide a match of search results to the original settle transaction); and Non-Referenced Refund (refunds on the transactions previously settled with a different acquirer).

As to a Non-Referenced Refund, in embodiments, an ITPS may share credit card details in order to have the mentioned amount refunded directly to the card. In this instance, a third-party server or other computing device may create a separated merchantSiteId field or other field ID and install a new API call which may be used only for these transactions. The merchantSiteId field or other field ID and new API call may be employed in order to maintain accuracy and/or security of transactions while also keeping the regular transactions as they are.

ITPSs may be configured with various APIs providing various discrete functionality. An exemplary API of an ITPS may regard client onboarding, which may allow a client server to communicate with an ITPS via a Secure File Transfer Protocol (SFTP) and share the client's CSI files. Other APIs of the ITPS may comprise creating a dedicated folder for the client itself, which can separate the files between the clients; allowing an ITPS to store any necessary third-party credentials. The third-party credentials may be employed as dedicated sets of client credentials for a third-party API. ITPS may also have APIs that support clients with multiple Billing Settlement Plans (BSP), e.g., a BSP for each country in which a client airline computing system has sales, here, one or more API may support multiple sending locations for a client airline computing system and/or multiple third-party merchant identification numbers. Other ITPS APIs may support tracking, connecting and validating files received by an ITPS as well as adding, editing or deleting client configurations within and/or for client computing systems. These editing and deleting APIs may function via an SFTP communication link with a client airline computing system and/or another computing system via a network connection.

In embodiments, an ITPS may be may be hosted as a cloud-based server network. Such server-network may: use SFTP server credential to receive batch BSP/CSI files from clients/airlines; use S3 buckets to store the received files; use DynamoDB functionality to store Client/Airline information, all transactions and communication with one or more third-party computing system (e.g., use a request/response table); use Lambda functionality, which may be triggered at a dedicated cut off time, in order to parse the received files and store all transaction data into DynamoDB; and/or use Lambda functionality that may be triggered at a previously agreed time with third-party computing systems, to replay data as dummy transactions (e.g., Authorization, Sale/Refund) to a third-party computing system payment gateway.

FIG. 1 shows exemplary process flow using an Intermediary Transaction Processing Server (ITPS) as may be employed in some embodiments. At step 1 a customer 10, such as a traveler or other person seeking services via an agent may communicate with the travel agent 20 via telephone or via computer interface or through some other communication method. The customer 10 may provide purchase, change, refund, or other instructions 21 to the travel agent 20 to purchase, change, refund services offered by an airline 60. The purchase services may include purchasing tickets for travel, purchasing freight services, purchasing frequent flyer miles, purchasing baggage transport, purchasing seat assignments, purchasing boarding status, purchasing flight cabin status, purchasing in-flight meals, as well as other services offered by the airline 60. The changes may include changes to any of the above purchases as well as other services offered by the airline 60. Likewise, refund services may include refunds to any of the above purchases as well as other services offered by the airline 60. The travel agent 20 may create an itinerary for the requested services, assign a personal name record for the itinerary, and accept payment from the customer 10 for the requested services. The payment may be collected from various methods including cash, credit, debit, PayPal, etc. The travel agent 20 may also verify ticket availability and ticket particulars via a Global Distribution System (GDS) computing system. This GDS may in turn verify specific ticket information and make ticket purchases from an airline 60 computing system. As particulars become known the airline 20 computing system may populate fields in the itinerary. These fields can include the number of passengers, the number of bags, seat assignments, meal selections, seat preferences, payment status, payment amount, passenger names, ticket numbers, flight leg details, frequent flyer particulars, and other information associated with the itinerary. The GDS computing system may, in real-time, issue the tickets to the travel agent 20 as the itinerary is being prepared and/or populated. On a periodic basis, daily, twice-daily, etc., the GDS computing system may send batch files to a Billing and Settlement Plan (BSP) computing system 30. These batch files may contain all of the transactions for the period associated with a specific airline. The transactions may comprise the itineraries created by one or more travel agents for the period of the batch file. The BSP 30 with an associated Data Processing Center (DPC) may cull and gather received batch files for an airline and create a second batch file for receipt by the airline computing system 60 and the ITPS 40. The ITPS may receive this second batch file and extract payment information as well as infer missing information to be filled in. The inferred information may be derived from various sources including a batch file whether presently or previously received. The ITPS 40 may send instructions, the second batch file, a revised second batch file and/or a third batch file, see 4B, to a gateway of a Settlement Service Provider (50). The SSP may then receive and process this received batch file and provide payment to the airline computing system 60 on a Time+2 (i.e., ticket sale day plus two days) schedule 51 for a large percentage (e.g., 60%, 70%, 85%, 90%, etc.) of the total agent collections identified in the agent batch file. The SSP may also process the received batch file to provide payment to the airline computing system 60 for the remainder of the total agent collections identified in the agent batch file on a Time+30 schedule (i.e., ticket sale day plus thirty days) 52. On or around this second payment and processing by the SSP, the BSP 30 may send full payment of the agent collections in the agent batch file to the SSP computing system 50, see FIG. 1 at 31.

The ITPS's receipt and processing of the BSP batch file as taught herein, can enable the airline computing system 60 to receive payments as taught herein without necessarily being programmed to make requests or provide instructions to the SSP ahead of receiving payment or transactional information from the SSP. In so doing, an airline computing system need not necessarily be updated or programmed to make calls, provide instructions, provide queries, or perform other actions and, instead the ITPS can perform needed queries, processes, and/or interactions with other computing systems to facilitate SSP transactions with the airline computing systems. Similarly, an airline computing system 60 need not be burdened with protocols or tasks or calculations or processes to make calls, provide instructions, provide queries, or perform other actions in order to facilitate SSP transactions with the airline computing systems as described herein. Thus, airline computing system maintenance, storage demands, storage quantity, and/or system performance may each or all be enhanced or otherwise improved in some embodiments.

In some embodiments, the ITPS 40 may send instructions, a file, the second batch file, a revised second batch file and/or a third batch file, see 4A, to the travel agent 20 to provide status of batch file handling or other processing by the settlement service provider 50, its gateway, and/or the airline computing system. In some instances, status may be provided by the ITPS 40 within a set time period, such as two days, seven days, ten days, thirty days, sixty days, etc., whereby the travel agent computing system need not provide instructions to fund previously booked flights or other itinerary costs that will not or cannot be satisfied by the airline. For example, the ITPS 40 can provide one or more files or instructions or indicators to the travel agent computing system to temporarily reduce funding obligations or risk exposure for previously booked flights or other travel itinerary items.

Figure 2:
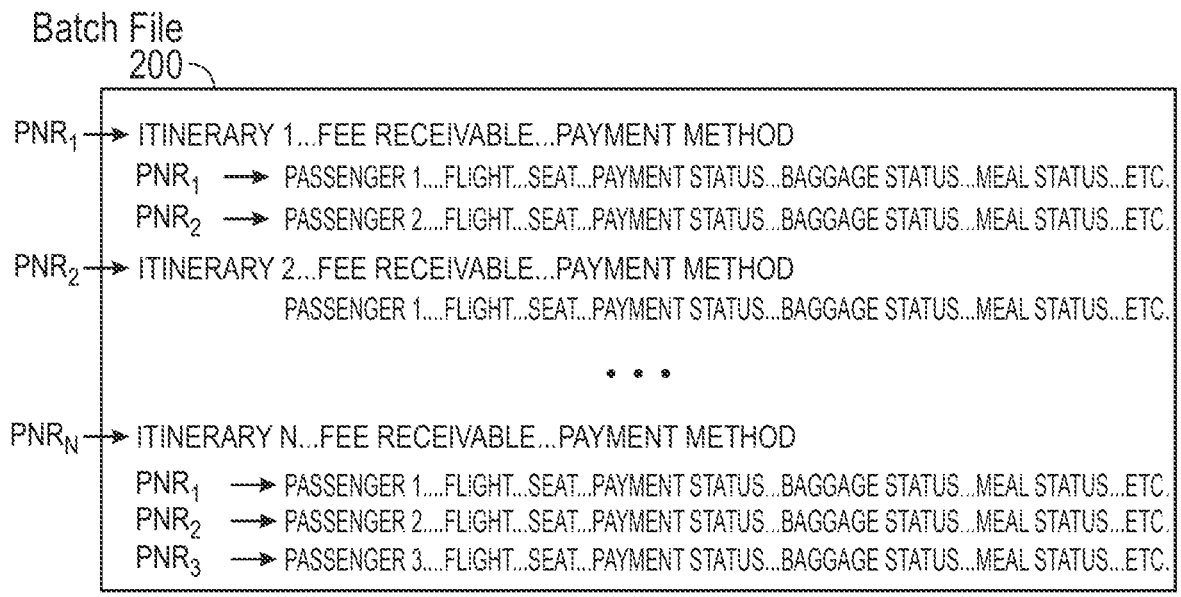
FIG. 2 shows computer systems, a communication network, communication paths, and an exemplary batch file as may be employed in some embodiments.
Figure 2:
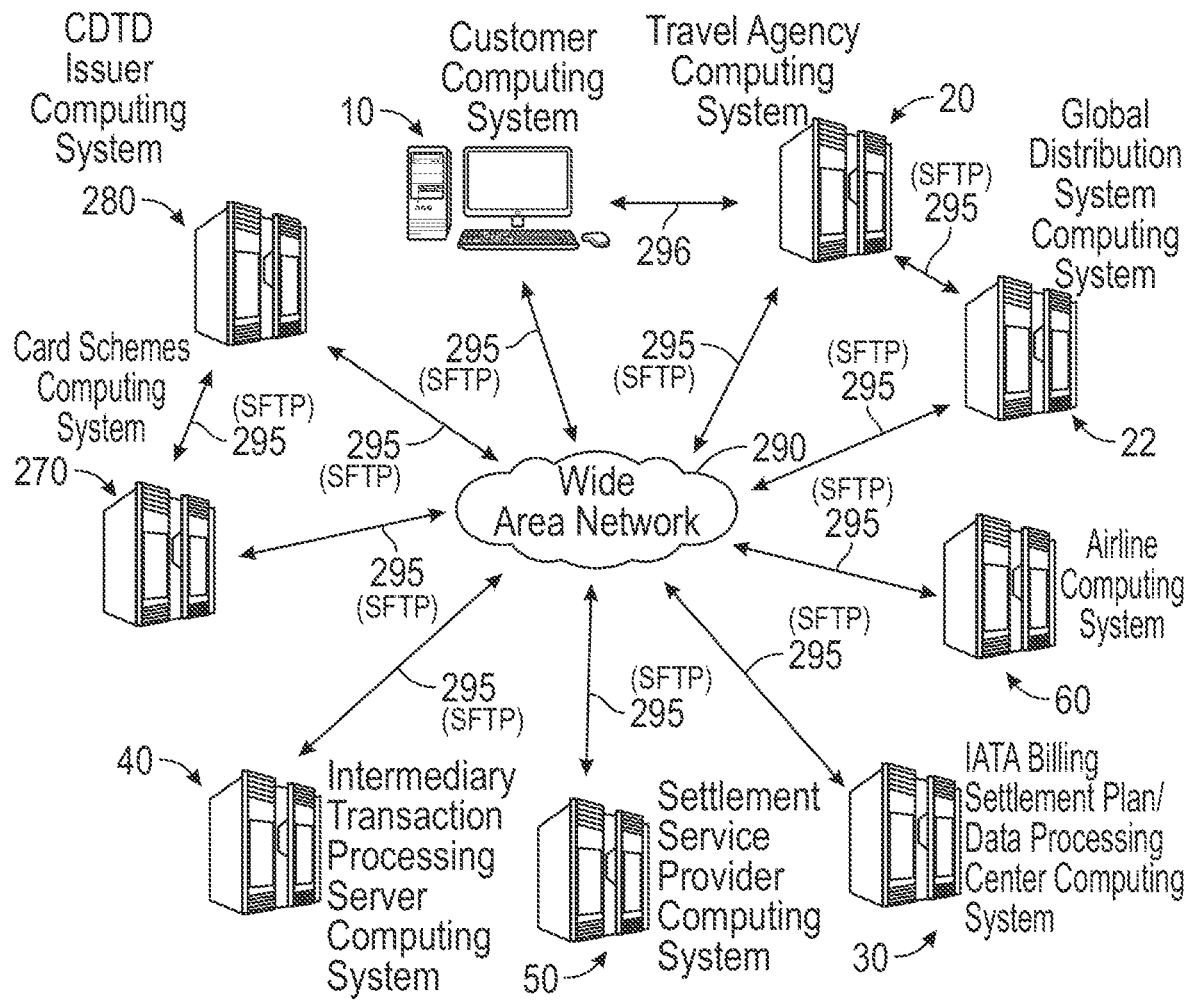

FIG. 2 shows computer systems (10, 20, 22, 60, 30, 50, 40, 270, and 280), a communication network 290, communication paths (295, 296), and an exemplary batch file 200 as may be employed in some embodiments. The batch file 200 may be exemplary of information contained in the batch files described above in FIG. 1. The batch file 200 is shown with a plurality of itineraries 1-N where each itinerary may be identified with a Personal Name Record (PNR1-N) and each itinerary may contain various data fields in which data elements may be entered. These data fields may include passenger name, flight information, payment status, baggage status, meal status, etc. These data fields may contain data elements such as the actual flight number, the actual passenger name, the actual meal ordered, other entered data, as well as place holders to be finished later and/or be empty or otherwise incomplete. As noted above, in embodiments, an ITPS 40 may seek to complete missing or incomplete data elements in data fields by inferring missing data elements from other areas of the itinerary with the missing or incomplete data elements as well as from other areas of the batch file or another batch file or another data element source or repository. By the ITPS completing missing or incomplete data elements, subsequent recipients of the batch file or information from the batch file may need not research the missing data and may handle an itinerary or other portion of the batch file as if the added or corrected data was present from the travel agent computing system 20. This correction and/or addition or change can serve to promote more efficient handling of incomplete or error filled itineraries after the agent computing system 20 has started the ticketing process. For example, an airline computing system 60 or a BSPDPC computing system 30 may process the received itinerary using fewer steps or on a more efficient processing track when compared to processing the same received itinerary had it not been previously corrected, added or changed by an ITPS as described above.

As can be seen in FIG. 2, nine computing systems are shown. These computing systems may be single computing devices such as a PC or server as well as groups of PCs or servers. Communications between the various computing systems may be direct between each other as well as via a wide area network 290. Security protocols, such as SFTP, may be employed for these communications. In some instances, as is shown at 296, SFTP protocols or other secure protocols may not be employed. The various computing systems shown in FIG. 2 may employ the processes taught herein, including those described specifically with FIGS. 1 and 3-4. Labelled in FIG. 2 are wide area network 290, travel agency computing system 20, Global Distribution System computing system 22, Airline computing system 60, Billing Settlement Plan/Data Processing Center computer system 30, Settlement Service Provider computing system 50, Intermediary Transaction Processing Server computing system 40, Card Scheme computing system 270, and Card Issuer computing system 280.

Figure 3:
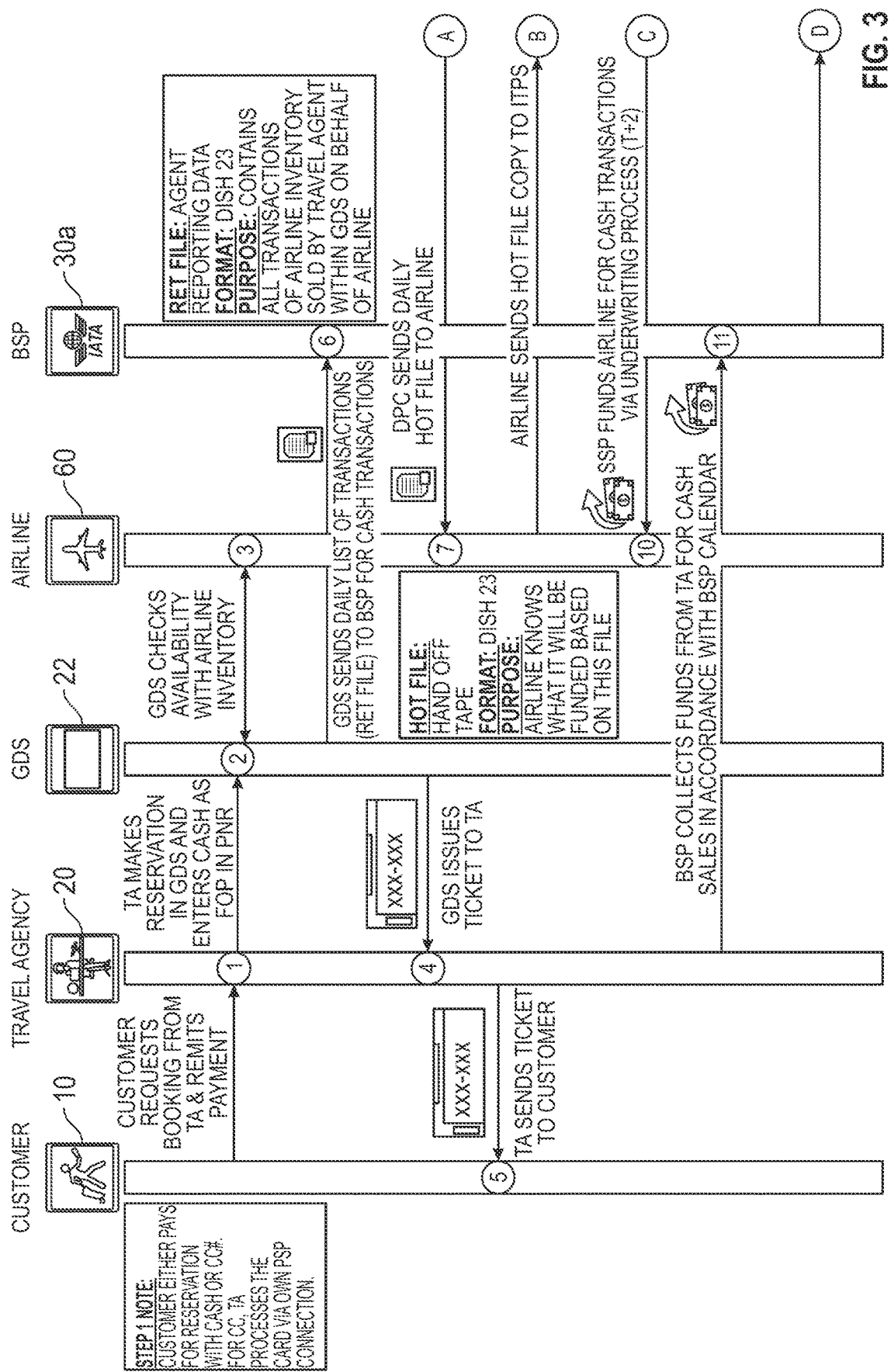
FIG. 3 shows communication flow, as may be employed in some embodiments.

FIG. 3 shows communication flow that may be employed in some embodiments. Travel agency computing system 20, Global Distribution System computing system 22, Airline computing system 60, Billing Settlement Plan computing system 30*a*, Data Processing Center computer system 30*b*, Settlement Service Provider computing system 50, and Intermediary Transaction Processing Server computing system 40 are labelled in FIG. 3. Various communications and processes are identified within and between these various identified computer systems of FIG. 3. These various communications and processes may comprise a chronological exchange and may include the chronology identified in FIGS. 3 and 4 as well as other chronological orders. At the onset a customer/traveler may communicate with a travel agency via various communication methods, e.g., telephone, computer, etc. and request a ticket booking. After receiving one or more communications, a travel agent computing system 20 may create a PNR (Passenger Name Record) in the GDS (Global Distribution System) computer system 22 terminal and designate the form of payment as "cash." This designation may signify that the travel agent computing system will accept and collect various forms of payment from the traveler for the tickets being sold. These payments may be made in cash, credit card, debit card, PayPal, etc., but should preferably be collected by the travel agent and should preferably be paid to the airline, minus any handling fees, etc., originating from the travel agent computing system 20. As between points 2 and 3, the GDS computing system 22 can verify availability of ticket inventory with an airline inventory system, which may be a backend process offered by an airline computing system 60). The travel agent may enter the ticketing command into the GDS computing system 22 terminal to issue the ticket(s) in the PNR as shown at point 4. Because this is a transaction where payment is collected by the travel agent computing system 20, there may be no authorization request for the ticket to issue and the ticket may issue immediately and be sent to the customer as shown at point 5, which serves to conclude the transaction.

Figure 4:
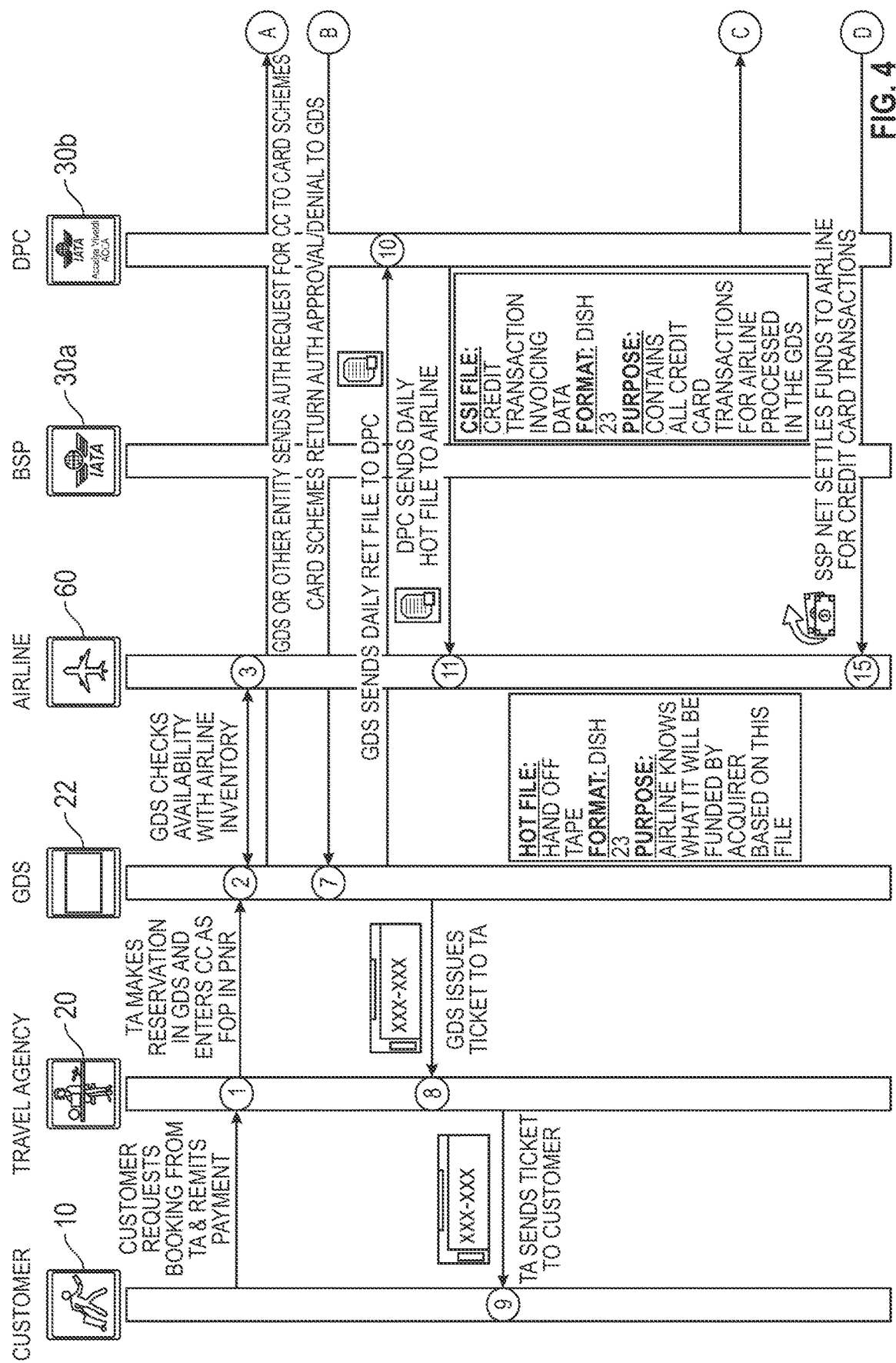
FIG. 4 shows communication flow, as may be employed in some embodiments.
Figure 4:
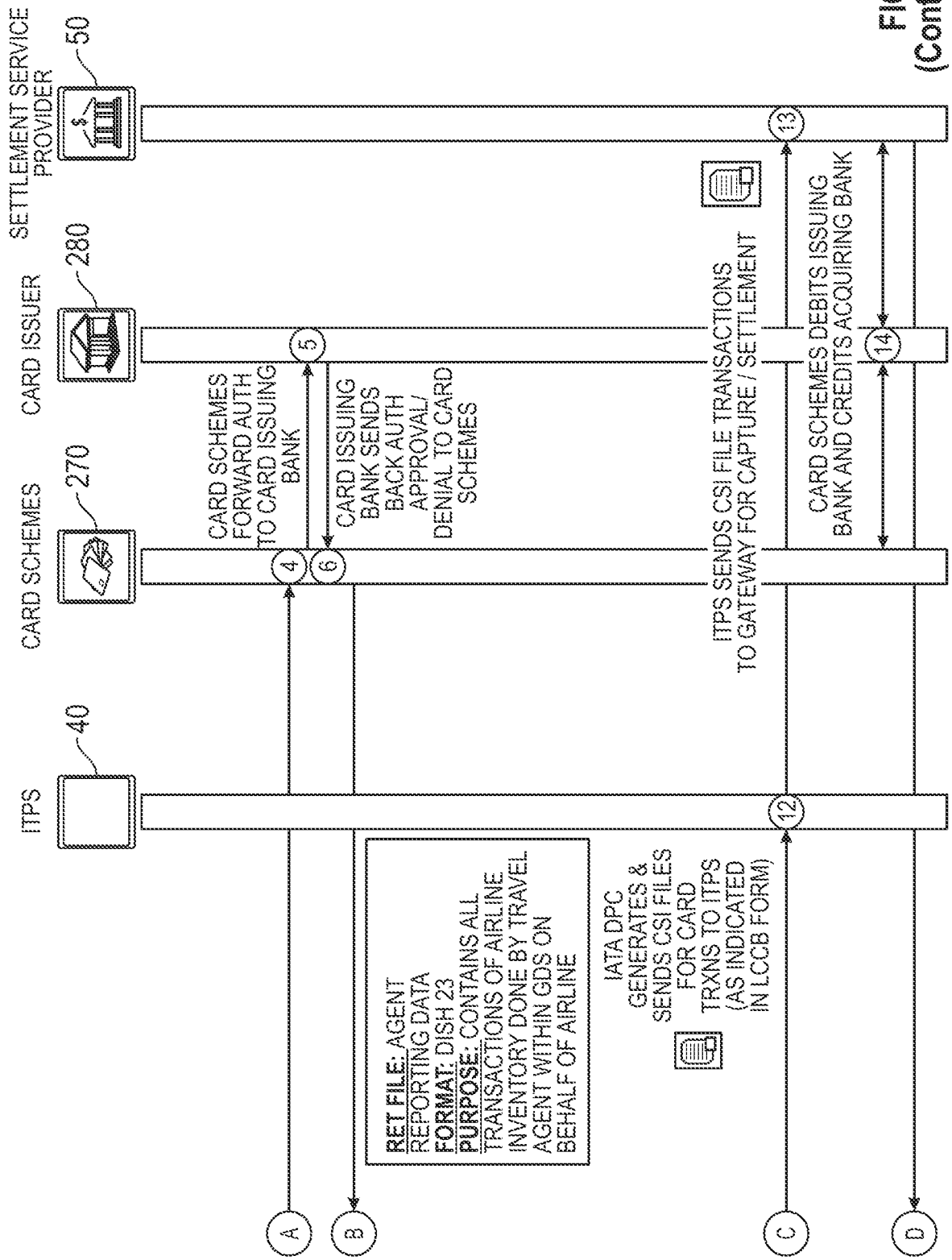

Periodically, batch file processing may be carried out. These can be end of business day, end of a twenty-four hour period, end of a twelve-hour period or some other equally spaced or non-equally spaced periodicity. At the end of the day or other period, there may be a series of legacy processes that generate several files that may be exchanged between GDSs 22 and BSP 30*a*/DPC 30 *b* and ITPS 40 and other computing systems. These may comprise one or more of the following. At point 6, the GDS 22 may first create and send a daily, or other periodicity, a batch RET (Resolution Enhancement technology) file (Agent Reporting Data File) to the Data Processing Center (DPC) 30*b*. This batch RET file may contain all sales and refunds processed for that day on the airline's ticket stock. This batch RET file may contain both cash and credit card transactions. Concurrently, or substantially concurrently, at point 7, Data Processing Center (DPC) 30*b* may create a daily batch HOT (Hand Off Tape) file and send a copy to the Airline computing system 60. The Airline computing system 60 may feed the batch HOT file into its Revenue Accounting System, and based on these received batch HOT files, the Airline computing system can be informed as to what to expect to receive for its cash transactions (via the BSP Cash settlement process of the BSP 30*a*) and for its credit card transactions (from its Card Schemes computing system 270 and Card Issuer computing system 280 as shown in FIGS. 2 and 4). At point 8 an airline computing system 60 may send a copy of their HOT file to an ITPS 40. As part of point 9, an ITPS 40 may parse out individual cash transactions from the batch file, which contains both travel agent customer payment collections and direct airline collections, and perform a series of data integrity checks, to ensure all preferred and/or mandatory data elements are included in the batch HOT file. Once the transactions are parsed out, they may be sent by an ITPS, one by one, to a third-party gateway to be recorded by the third-party. These recordations may be used such that the third-party or any of the Settlement Service Provider computing systems can determine what to prefund the airline computing system for the travel agent customer payment collections reflected in the batch HOT file. In embodiments, an ITPS 40 can display the transactions in a proprietary dashboard, provide reporting and analytics capabilities to the airline computing system 60 for transactions that otherwise would have been indeterminate to the airline computing system from the received batch HOT file. At point 10, either a third-party or any Settlement Service Provider computing system 50 may prefund the airline computing system for "cash" transactions in a T+2 timeframe, mimicking the settlement cycle of a credit card transaction. At point 11, DPC computing system 30*b* may act as a clearing house operator, and sweep funds from the travel agency in accordance with the settlement cycle instructions for that BSP market and/or the associated batch HOT file. At point 12, the DPC 30*b* may be providing funding to or on behalf of the Settlement Service Provider for the funds that were pre-funded at point 10, thereby completing the funding flow. In embodiments, the DPC 30*b* may fund a third party beneficiary (FBO—For Benefit Of) account set up for the Settlement Service Provider computing system 50 by the Airline computing system 60.

FIG. 4 shows communication flow that may be employed in some embodiments. These may include indirect credit card transactions from purchase to settlement. Travel agency computing system 20, Global Distribution System computing system 22, Airline computing system 60, Billing Settlement Plan computing system 30*a*, Data Processing Center computer system 30*b*, Settlement Service Provider computing system 50, Intermediary Transaction Processing Server computing system 40, Card Schemes computing system 270 and Card Issuer computing system 280 are labelled in FIG. 4. Various communications and processes are identified within and between these various identified computer systems of FIG. 4. These various communications and processes may comprise a chronological exchange and may include the chronology identified in FIGS. 3 and 4 as well as other chronological orders.

At the onset a customer/traveler may communicate with a travel agency via various communication methods, e.g., telephone, computer, etc. and request a ticket booking. The travel agent computing system 20 may create a PNR (Passenger Name Record) in the GDS (Global Distribution System) computing system 22 terminal and enters the customer's credit card number in the PNR as the form of payment. The GDS terminal may verify availability of ticket inventory with an airline inventory system of the airline computing system 60 as a backend process. Once verified, the travel agent may enter a ticketing command into the GDS terminal to issue the ticket(s) in the assigned PNR. This may initiate an authorization request for the credit card in the FOP Form of Payment that goes directly from the GDS to the Card Schemes computing system 270. In these instances, the credit card processing uses an indirect framework whereby the authorization request does not go to the acquirer—rather, the authorization request is sent to the Card Schemes computing system 270 (Visa/MC etc.) directly, which then pass it on to the Card Issuer computing system 280 to ensure sufficient funds for the transaction. The Card Issuer computing system 280 returns an authorization approval or denial back to the Card Schemes computing system 270 and the Card Schemes computing system 270 cascade this response back to the GDS computing system 22 in real time. If the authorization is an approval, the GDS computing system 22 successfully tickets the PNR and the Travel Agent computing system 20 provides the ticket to the customer 10.

Periodically, batch file processing may be carried out. These can be end of business day, end of a twenty-four hour period, end of a twelve-hour period or some other equally spaced or non-equally spaced periodicity. At the end of the day or other period, there may be a series of legacy processes that generate several files that may be exchanged between GDSs 22 and BSP 30a/DPC 30 b, ITPS 40, Card Schemes computing system 270, Card Issuer computing systems 280 and other computing systems. These may comprise one or more of the following. At point 10, the GDS computing system 22 first creates and sends the daily RET file (Agent Reporting Data File) to the Data Processing Center (DPC) computing system 30b—the batch RET file contains all sales and refunds processed for that day on the airline's ticket stock. This batch RET file contains both cash and credit card transactions. Concurrently or substantially concurrently, at point 11, the Data Processing Center (DPC) computing system 30b creates the daily batch HOT (Hand Off Tape) file and sends a copy to the airline computing system 60. The airline computing system 60 feeds the batch HOT file into its Revenue Accounting System, and based on these files, the airline computing system 60 can determine what to expect to receive for its cash transactions (via the BSP Cash settlement process) and for its credit card transactions (from its Acquirer). At point 12, the Data Processing Center computing system 30b also generates the CSI file (Credit Transaction Invoicing Data file). This batch file may be either sent to the acquirer directly if they are connected to the BSP computing system 30b and are able to ingest the DISH file format, or to Accelya Card Clear, which reformats the file into a clearing file and sends it onto the airline acquirer. For BSP computing system 30a, instead of sending the CSI file to Accelya card clear or an alternate acquirer, an ITPS 40 may be configured to receive these daily batch CSI files on behalf of the airline in a DSS-compliant environment (separate from traditional ITPS processing), parse the CSI/CCB files and send the individual transactions (both sales and refunds) to a third-party gateway. In certain embodiments, all that is required from the airline computing system to select ITPS/third-party as its new acquirer may be to amend a Local Credit Card Billing (LCCB) form and submit to a third party requesting the change of acquirer/processor. As part of point 12, ITPS 40 may also perform a series of data integrity checks, to both ensure successful capture and settlement, as well as to ensure the lowest possible interchange fee for the airline computing system. To promote a low or lowest possible interchange fee for EMDA (Associated EMD transactions) an ITPS 40 may "scrape" itinerary level data from the associated ticket number and populate those data elements for the EMDA transaction, thereby ensuring that the transaction will qualify for the lower interchange fee (transactions that do not contain Level 3, itinerary level data are downgraded to a more expensive/higher interchange fee). In embodiments, an ITPS 40 may be configured to display these transactions in a sophisticated dashboard, providing reporting and analytics to the airline for transactions that otherwise would have been opaque to them. As point 14, a third-party gateway may then be able to submit these transactions for capture and settlement to the Card Schemes computing system 270. A third-party server may be configured to show/display these transactions (including airline addendum data, searchable by ticket number) in a Dashboard. The third-party server may be configured to net settle the funds to the Airline's account for credit card transactions.

Figure 5:
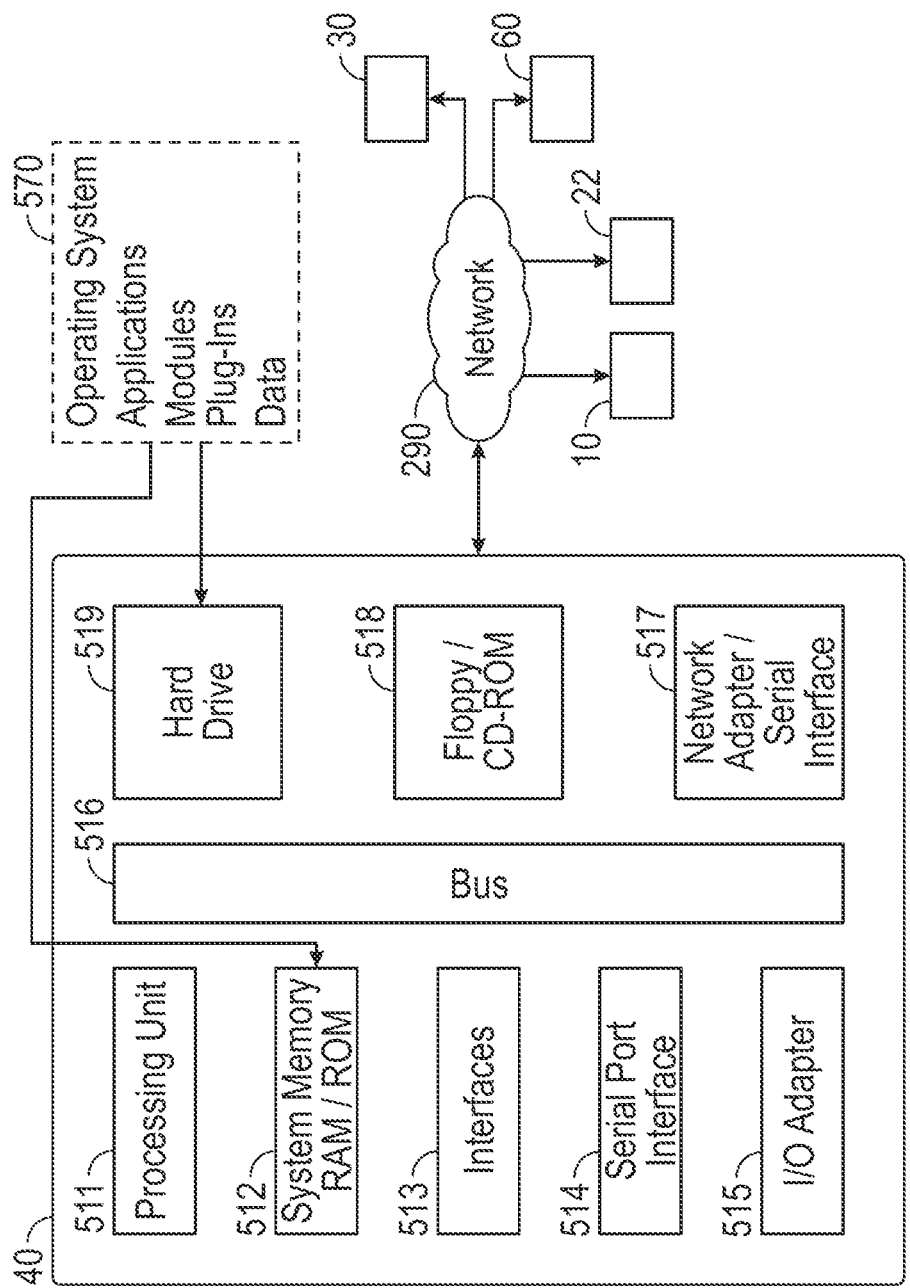
FIG. 5 illustrates a basic block diagram of computer hardware, a wide area network, and various other party computing devices, as may be employed in some embodiments.

FIG. 5 illustrates a basic block diagram of computer hardware, a wide area network, and various other party computing systems as may be employed in some embodiments. An ITPS 10 or other computing system that includes a CPU 511 and a main memory 512 connected to a bus 516 is shown. The CPU 511 is preferably based on the 32-bit or 64-bit architecture. A display, such as a liquid crystal display (LCD) may be connected to the bus 516 via an I/O adapter 515. A storage unit 519 such as a hard disk or solid-state drive and a drive 518 such as a CD, DVD, or BD drive may be connected to the bus 516 via a SATA or IDE controller. The operational software may include an operating system, applications, modules 570, and plug-ins. The CT 40 may be connected to a network 290 that is also connected to numerous computing systems 30, 60, 22, 10 as well as other computing systems taught herein. The ITPS may be configured to function as disclosed herein and may communicate with other devices and systems through the network 290, which may be a Wide Area Network, such as the Internet. Instructions to configure the ITPS may be stored in the storage unit as well as in main memory. These instructions may configure the CPU to perform the functions and provide the services of an ITPS or other computing systems as identified herein.

The language of the application including the figures is used to describe embodiments and should not be considered to limit the invention to the specific combinations provided. Accordingly, the teachings of the application go beyond the specific figures and applicable text provided herein. Numerous other configurations are possible, including combinations of the embodiments provided herein, with more or fewer features and features further mixed among or between embodiments.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operation, elements, components, and/or groups thereof.

The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

Likewise, numerous embodiments are possible beyond those specifically described above as well as provided below. The embodiments described herein are illustrative and should not be considered to be limiting. For example, fewer or more features of a device or system, and fewer, more, or different actions or processes may accompany those already specifically described herein. Also, processes described herein may be undertaken in various orders unless a specific order is explicitly called for in any applicable claim or description. Likewise, features of the devices and systems described herein may be combined in various ways, not employed, and shared amongst themselves or in other devices and systems.

What is claimed is:

1. An intermediary transaction processing server (ITPS) comprising:
    a processor; and
    a memory storing instructions, the instructions, when executed by the processor, cause the processor to perform processes comprising:
    receiving, via a network, a copy of a third-party data batch file, the batch file containing transaction data for a plurality of transactions, the transaction data comprising specific information regarding the delivery of passengers or goods (cargo) and specific information regarding payments collected by the third-party, the payments for the transport of passengers or goods (cargo);
    identifying collected payment information, for the payments collected by the third-party, from the received copy of the batch file;
    processing the batch file such that an airline computing system or an another computing system is enabled to collect payment funding from a settlement service provider (SSP) computing system for transactions contained in the batch file without the airline computing system or the another computing system having been configured to make a request instruction seeking collected payment funding from the SSP computing system for transactions contained in the batch file, and
    sending identified collected payment information from the received copy of the batch file to a settlement service provider (SSP) gateway, the gateway providing the collected payment information to the SSP computing system, the SSP computing system using the collected payment information to provide funding to an airline computing system or an another computing system account without the airline computing system or the another computing system having been configured to make a request instruction seeking collected payment funding from the SSP computing system for transactions contained in the batch file.

2. The ITPS of claim 1 wherein the instructions, when executed by the processor, cause the processor to also perform processes comprising:
    parsing the batch file to identify individual collected payment transactions from the batch file.

3. The ITPS of claim 2 wherein the instructions, when executed by the processor, cause the processor to also perform processes comprising:
    individually sending identified individual collected payment transactions from the batch file to the SSP computing system for use by the SSP computing system.

4. The ITPS of claim 2 wherein the instructions, when executed by the processor, cause the processor to also perform processes comprising:
    making available for display at a different location, information regarding identified individual collected payment transactions from the parsed batch file.

5. The ITPS of claim 1 wherein the instructions, when executed by the processor, cause the processor to also perform processes comprising:
    identifying travel itinerary and other data and determining if any data are missing in the batch file and, if data are determined to be missing, infer missing data for a specific travel itinerary using information parsed from the received batch file.

6. The ITPS of claim 1 wherein the instructions, when executed by the processor, cause the processor to also perform processes comprising:
    identifying a single travel itinerary or airway bill from the plurality of travel transactions,
        wherein the batch file is received from an airline or other third party computing system.

7. The ITPS of claim 1 wherein the instructions, when executed by the processor, cause the processor to also perform processes comprising:
    performing a series of data integrity checks to verify that travel itinerary and other data are included in the batch file.

8. The ITPS of claim 1 wherein processing the batch file comprises supplementing a standardized file configuration present in the batch file.

9. An intermediary transaction processing server (ITPS) comprising:
    a processor; and
    a memory storing instructions, the instructions, when executed by the processor, cause the processor to perform processes comprising:
    receiving, via a network, a copy of a third-party data batch hand-off-tape (HOT) file, the batch HOT file containing a plurality of passenger name records (PNRs), each passenger name record (PNR) comprising travel itinerary information and travel payment information;
    identifying collected customer payment transaction data from the travel payment information from the received copy of the batch HOT file;
    processing the batch HOT file such that a computing system account benefiting an airline is enabled to collect payment funding from a settlement service provider (SSP) computing system for transactions contained in the batch file without an airline computing system having been configured to make a request instruction seeking collected customer payment funding from the SSP computing system for travel itineraries from the batch HOT file, and
    sending identified collected customer payment cash transaction data from the received copy of the batch HOT file to a settlement service provider (SSP) gateway, the gateway providing the collected customer payment transaction data elements to the SSP computing system, the SSP computing system using the received identified collected customer payment transaction data elements to provide collected customer payment funding to a computing system account benefiting an airline without an airline computing system having been configured to make a request instruction to receive collected customer payment funding from the SSP computing system for travel itineraries from the batch HOT file.

10. The ITPS of claim 9 wherein the instructions, when executed by the processor, cause the processor to also perform processes comprising:
identifying itinerary data and determining if any data are missing in the batch HOT file and, if data are determined to be missing, infer missing data using information parsed from the received batch HOT file.

11. The ITPS of claim 9 wherein the instructions, when executed by the processor, cause the processor to also perform processes comprising:
identifying a single travel itinerary from a passenger name record (PNR) of the plurality of passenger name records (PNRs), wherein the batch HOT file is received from the airline computing system.

12. The ITPS of claim 9 wherein the instructions, when executed by the processor, cause the processor to also perform processes comprising:
parsing the batch HOT file to identify individual collected customer payment transactions from the batch HOT file.

13. The ITPS of claim 9 wherein the instructions, when executed by the processor, cause the processor to also perform processes comprising:
identifying a single travel itinerary from the plurality of passenger name records;
performing a data integrity check of the single travel itinerary to verify that meal data or bag data or both are included in the PNR.

14. The ITPS of claim 9 wherein the instructions, when executed by the processor, cause the processor to also perform processes comprising:
performing a data integrity check of a PNR and if missing data is identified, filling in missing data in the PNR using data inferred from the batch HOT file.

15. The ITPS of claim 9 wherein the instructions, when executed by the processor, cause the processor to also perform processes comprising:
making available for display at a different location, information regarding identified individual collected customer payment transactions from the parsed batch HOT file, and
wherein the copy of the batch HOT file is received daily.

16. The ITPS of claim 9 wherein processing the batch HOT file comprises supplementing an IATA (International Air Transport Association) standardized file configuration present in the batch HOT file.

17. A process of handling a batch file comprising:
receiving a third-party data batch file at an intermediary transaction processing server (ITPS), the batch file comprising a plurality of passenger name records (PNRs), the PNRs of the batch file each comprising name, passage date and ticket number;
supplementing, at the ITPS, an IATA (International Air Transport Association) standardized file configuration present in the batch file such that an airline server system is enabled to collect payment funding from a settlement service provider (SSP) computing system for transactions contained in the batch file without the airline server system having been configured to make a request instruction seeking collected payment funding from the SSP computing system for transactions contained in the batch file,
searching at the ITPS for one or more missing data elements from a first passenger name record in the batch file;
if a missing data element is found in the first passenger name record by the ITPS, entering inferred data into the missing data element;
parsing at the ITPS a second passenger name record from the batch file;
sending the parsed second passenger name record to a gateway for the settlement service provider computing system; and
the settlement service provider computing system providing funding status for the batch file to the airline server system,
the airline server system not being configured to make a request instruction seeking funding status associated with transactions contained in the batch file from the settlement service provider computing system.

18. The process of claim 17 further comprising
the settlement service provider computing system providing information linking funding received by the airline server system with individual PNRs from the batch file.

19. The process of claim 17 wherein the received batch file is sent by the airline server system and wherein the settlement service provider computing system provides funding for the batch file to the airline server system in a timeframe mimicking a settlement cycle of a credit card transaction.

20. The process of claim 17 wherein the received batch file is a hand off tape (HOT) file previously received by the airline server system and subsequently sent by the airline server system after its receipt.

\* \* \* \* \*